July 5, 1927.

C. H. M. BULL 1,634,318

ROLLER CUTTER MOUNTING

Filed March 28, 1927

INVENTOR.
Clinton H. M. Bull.
BY
ATTORNEY

Patented July 5, 1927.

1,634,318

UNITED STATES PATENT OFFICE.

CLINTON H. M. BULL, OF HOUSTON, TEXAS, ASSIGNOR TO REED ROLLER BIT COMPANY, OF HOUSTON, TEXAS, A CORPORATION OF TEXAS.

ROLLER-CUTTER MOUNTING.

Application filed March 28, 1927. Serial No. 178,986.

This invention relates to deep well drilling apparatus, and more particularly to means to mount a roller cutter upon the head of a bit.

The object of the invention is to provide means whereby a roller cutter may be quickly, easily and securely mounted upon its bushing and removed therefrom.

A further object of the invention is to provide sealing means between the cutter and the head whereby to prevent the escape of lubricant from between the cutter and its bushing, and also to prevent the entry therebetween of dirt, water or other foreign matter.

Various other objects and advantages will be apparent from the following description.

Figure 1:
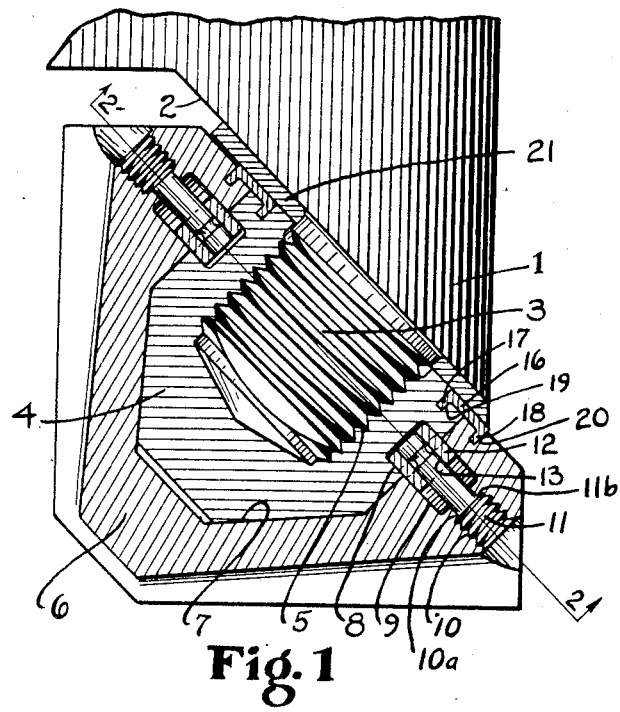
Figure 2:
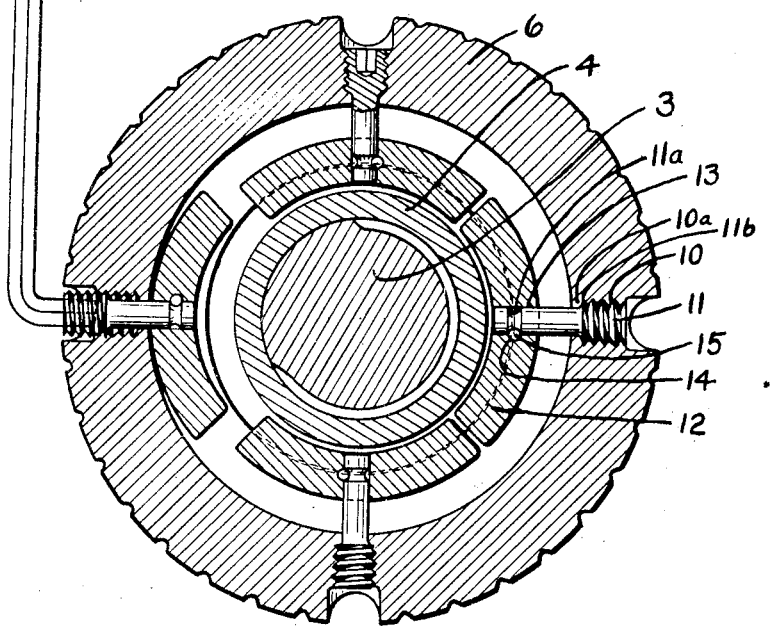

The preferred embodiment of the invention is illustrated in the accompanying drawing in which Fig. 1 is a fragmentary elevation of a bit head partly in section, and Fig. 2, a section on the line 2—2 of Fig. 1.

Referring specifically to the drawings, 1 indicates the head of a bit having a lower face 2 inclined downwardly and outwardly from the longitudinal axis thereof. Integral with head 2 and projecting inwardly and downwardly is a screw threaded spindle 3. Bushing 4 has a centrally disposed screw threaded recess 5 to receive spindle 3. Roller cutter 6 has a centrally disposed recess 7 to receive bushing 4.

An annular groove 8 is formed in the outer face of bushing 4, and an annular groove 9 is formed in the recess 7 of cutter 6, groove 8 being opposite groove 9 when the cutter is mounted on the bushing.

Cutter 6 has a plurality of bores 10, each having an inner reduced portion and an outer screw threaded portion, said bores being adapted to receive pin 11 having a reduced portion and a screw threaded portion to fit the respective portions of bore 10.

A ring comprising a plurality of sections 12 is adapted to fit in groove 8 of bushing 4 and groove 9 of cutter 6, or to rest completely in groove 9, the width of said sections being equal to the depth of groove 9 and approximately twice the depth of groove 8.

Each section 12 has a bore 13 to receive the reduced end of pin 11, and a bore 14 to receive a pin 15, said pin 15 engaging annular groove 11$^a$ of pin 11 to rotatably lock pin 11 in section 12.

The length of the reduced portion of pin 11 and the length of the reduced portion of bore 10 are such that when pin 11 is screwed inwardly shoulder 11$^b$ will engage the surface 10$^a$ when pin 11 has carried section 12 to a position in groove 8 immediately adjacent but not in contact with the bottom thereof. By this arrangement approximately one-half of section 12 is inserted in groove 8 but section 12 and the bottom of groove 8 are prevented from coming in contact with each other, and cutter 6 is thereby rotatably secured to bushing 4 but cannot be locked thereto.

The depth of groove 9 of cutter 6 being equal to the width of section 12, it will be obvious that by screwing pin 11 outwardly section 12 can be brought to rest completely within groove 9, the inner surface of section 12 being then flush with the surface of recess 7.

A sealing ring 16 surrounds spindle 3. This ring 16 has two concentric annular flanges 17 and 18. The ring is made of soft metal and flange 17 is forced into annular groove 19 of bushing 4 and loosely fits annular groove 20 of cutter 6. This prevents the escape of lubricant from between the bushing and cutter, and also the entry therebetween of dirt, water or other foreign matter.

A washer 21 may be placed around spindle 3 as shown.

In assembling the device, the flange 17 of ring 16 is first forced into groove 19 of bushing 4. Bushing 4 is then screwed upon spindle 3. Pins 11 having been screwed to their outermost position, sections 12 are resting completely within grooves 9 of cutter 6. Groove 8 of bushing 4 is filled with grease. Cutter 6 is then placed upon bushing 4, and sections 12 moved partly, but not entirely, out of groove 9 and partly into groove 8 of bushing 4. Section 12 cannot be moved into contact with the bottom of groove 8, for reasons hereinabove pointed out. The entry of sections 12 into groove 8 effects an expulsion of the grease therein. Flange 19 of ring 16 has meanwhile entered groove 20 of cutter 6. The grease thus expelled therefore cannot escape from between bushing 4 and cutter 6, and hence spreads out over the surfaces in contact.

The parts are removed by screwing pins 11 outwardly and thereby drawing sections 12 out of grooves 8 after which cutters 6 may be slipped off bushing 4. Bushing 4 may then be unscrewed from spindle 3.

The invention is not limited to the exact form shown, and various changes may be made within the scope of the following claims.

I claim:

1. In a rotary boring drill, a spindle, a bushing on said spindle, a roller cutter on said bushing and an element to hold said cutter on said bushing, said bushing having a groove, and said element being carried by the cutter, and means to move said element partly into said groove.

2. In a rotary boring drill, a spindle, a bushing, a cutter, said bushing having a groove, and said cutter having a bore, and means to rotatably hold said cutter on said bushing, said means comprising a pin and an element, said pin and element being rotatably locked together and carried by said cutter, said pin being movable inwardly and outwardly in said bore to move said element partly into and completely out of said groove.

3. In a rotary boring drill, a spindle, a bushing having a groove, a cutter having a bore, said bore having a reduced portion, and means to rotatably hold said cutter on said bushing, said means comprising an element and a pin locked together and carried by the cutter, said groove being adapted to receive said element, said pin having a reduced portion to fit the reduced portion of said bore, and said pin being movable inwardly and outwardly in said bore, said reduced portions serving to prevent the inward movement of said pin more than a predetermined distance.

4. In a rotary boring drill, a roller cutter having a centrally disposed recess and a groove in said recess, an element having a width approximately equal to the depth of said groove, and adapted to fit therein, a support for said cutter adapted to enter the recess thereof and having a groove of a depth less than the width of said element and adapted to receive said element, and means to move said element outwardly from the groove in the cutter and into the groove in the support to rotatably hold said cutter on said support.

5. In a rotary boring drill, a roller cutter having a bore and a recess, a support for said cutter fitting in said recess, a groove in said recess and a groove in said support opposite the groove in said recess, and means to temporarily hold said cutter on said support, said means comprising a section of a ring, adapted to fit in said grooves, said section having a lateral bore and a longitudinal bore, a pin having a groove therein fitting in said lateral bore, and another pin fitting in said longitudinal bore and in said groove in said first-mentioned pin, said first-mentioned pin fitting in the bore in the cutter and being movable inwardly and outwardly therein.

6. In a rotary boring drill, a cutter having a recess, and an annular groove in said recess, a support for said cutter having an annular groove therein, and adjustable means to hold said cutter on said support, said means comprising a ring having a plurality of sections adapted to fit in said grooves, and means to move said sections inwardly and outwardly.

7. In a rotary boring drill, a cutter having a plurality of bores and a recess having an annular groove therein, a support for said cutter having an annular groove therein, and means to hold said cutter on said support, said means comprising a ring having a plurality of sections adapted to fit in said grooves, each of said sections having a pin rotatably locked thereto, said pins fitting in said bores and being adjustable inwardly and outwardly.

8. In a rotary boring drill, a cutter having a plurality of screw threaded bores, and a recess having an annular groove therein, a support for said cutter having an annular groove therein, and means to hold said cutter on said support, said means comprising a ring having a plurality of sections adapted to fit in said grooves, each of said sections having a screw threaded pin rotatably locked thereto, said pins fitting in said bores and adapted to be screwed inwardly and outwardly.

9. In a rotary boring drill, a bushing having an annular groove therein, a cutter having an annular groove therein, and a sealing ring having annular flanges fitting in said grooves.

10. In a rotary boring drill, a bushing having an annular groove therein, a cutter having an annular groove therein, and a sealing ring made of soft metal and having annular flanges fitting in said grooves, one flange of said ring being forced into the groove in the bushing and another flange of said ring fitting loosely in the groove in said cutter.

11. In a rotary boring drill, a support having a lubricant containing groove therein a cutter on said support, and means to force the lubricant out of said groove and between the inner surface of said cutter and the outer surface of said support, said means being carried by the cutter and being movable into said groove.

CLINTON H. M. BULL.